April 15, 1969     AKIO FUKUNAGA     3,438,249

FORCE TRANSDUCER STRUCTURES AND FABRICATING METHODS

Filed April 12, 1965

INVENTOR.
AKIO FUKUNAGA

BY *Fraser and Bogucki*

ATTORNEYS

United States Patent Office 3,438,249
Patented Apr. 15, 1969

3,438,249
FORCE TRANSDUCER STRUCTURES AND FABRICATING METHODS
Akio Fukunaga, 2055 Colby Ave.,
Los Angeles, Calif. 90025
Filed Apr. 12, 1965, Ser. No. 447,489
Int. Cl. G01n 7/22
U.S. Cl. 73—88.5         14 Claims This invention relates to pressure sensitive assemblies or transducers of a type which may be employed as strain gauges and, more particularly, to force transducer structures for providing a Wheatstone bridge configuration.

In engineering, normal strain is defined as the deformation in a given direction divided by the gauge length in the same direction. In elements of uniform shape and structure, the strain may have the same value throughout the extent of the element, and the strain increases as the stressing force becomes greater. If the element is stretched under a tensile load, tensile strains are developed, whereas if the element is shortened under a compressive load, compressive strains are developed. In elements of irregular shape which may be subjected to more complicated loading systems, the strain may vary from point to point; therefore a short gauge length is required for accurate measurement and a small strain gauge is needed.

Engineers are interested in the effects of high strain on various devices. If strains are known, properties of the material may be used to compute stresses, which must be kept within the allowable limits. Strain gauges typically are applied to the actual structure or component being tested to check the design computations and to determine the strain at points where it is impossible to compute them. Thus, strain gauges find general and widespread utilization in the testing of models and prototypes of devices and actual equipment parts. In such utilization, the strain gauge acts as a transducer in which variations in stress, either of tension or of compression, cause a corresponding variation in electrical resistance of a strain gauge which may be used to provide an indication of the strain developed in the associated device under the applied stress.

Although the deformations occurring in the particular element under test are often not readily detectable by physical measurement, the strain gauge, which is conventionally attached to the element under test or is arranged to receive the same loading forces as the test element, transforms a minute change of dimension into a corresponding change in an electrical parameter which is thereafter detected and amplified by conventional electrical circuitry. Typically, an electrical strain gauge may comprise a strip resistance element atached to or forming part of an element which may be placed under stress. One such arrangement is disclosed in the Eisler Patent 3,134,953. Such an element may comprise a simple two-electrode resistor which may be coupled in a series electrical circuit, or it may be provided in a particular configuration which presents an electrical circuit of the well-known Wheatstone bridge type. While a Wheatstone bridge element is preferable from the standpoint of sensitivity, it usually necessitates a structure which is somewhat larger in physical dimensions than a single resistance element. In certain applications, it is particularly desirable to use a strain gauge of minimum size, since a strain gauge of smaller size has the capability of measuring strain in an extremely localized region.

Moreover, the transducers which are adaptable as strain gauge devices oftentimes are useful in other applications. These include utilization in accelerometers, pressure pickups, load cells and the like. It is desirable to provide a configuration of a force transducer which is adaptable to a variety of such uses.

It is therefore a general object of the invention to provide an improved force transducer structure.

It is also an object of the invention to provide an improved force transducer structure which is readily adaptable to a variety of use applications.

It is a more particular object of the invention to provide an improved force transducer structure having a wheatstone bridge configuration.

It is a further object of the invention to provide a wheatstone bridge indicating circuit for use as a strain gauge in a physically small and compact arrangement.

Comparatively recent discoveries concerning the piezoresistive sensitvity of various materials, particularly semiconductors such as silicon, have suggested the use of such materials as transducers in strain gauge structures. An article by Geyling and Forst entitled "Semiconductor Strain Transducers," dealing with the physical properties and the theory of semiconductor elements which may be so employed may be found in The Bell System Technical Journal, May 1960, pp. 705–731. In view of these discoveries, it is a specific object of the present invention to provide a Wheatstone bridge type of strain gauge employing a material exhibiting piezoresistive properties.

In brief, particular arrangements in accordance with the present invention may comprise a disk or wafer of a piezoresistive material, preferably of a semiconductor such as silicon, cut and shaped in a particular configuration defining four resistive sections interspersed with four similar portions or segments to which electrical connections may be made to establish a wheatstone bridge circuit. The outer periphery of the disk may be shaped in a circular configuration to fit within the inner surface of a ring in which the disk is mounted. While preferably of metal, the ring may be formed of other materials such as glass or ceramic, if desired. In use, a load is applied to the ring, either in tension or in compression, and the ring distributes the load and serves to deform the enclosed disk in a manner which unbalanecs the normally balanced bridge circuit comprising the four sections of the disk. The unbalance in the respective sections comprising the two arms of the bridge is in a direction which tends to vary the output signal applied to an indicator connected across the two arms of the bridge. Thus, an improved sensitivity is provided in accordance with the invention in an extremely compact and efficient strain gauge structure. Where the use of the strain gauge is principally for the measurement of compressive loads, the outer surface of the ring also is configured in a circular configuration. However, where tensile loads are to be measured, the ring may be machined from a block in a manner to provide handles positioned at opposite sides of the ring. Cables may be attached to these handles for the application of the tensile loads.

In one particular arrangement in accordance with the invention, the disk comprises a circular semiconductor element having a pair of substantially rectangular apertures cut therein and intersecting at substantially right angles to each other at the center of the disk to provide a cross-shaped opening. Four similar quadrants of the disk are thus defined and electrical leads are connected to these in order to provide the desired connections for the electrical bridge circuit. The resistive sections are provided by the portions of the disk at the ends of the arms of the cross-shaped opening and are thus interspersed with the four quadrant segments.

In another particular arrangement in accordance with the invention, the semiconductor disk may be formed by cutting out a central core and also cutting peripheral sections out of the four quadrants of the disk. The portion of the disk remaining may be considered to define two diametric axes intersecting at substantially right angles. The four electrical bridge connections are made respectively to the four radial portions of the disk, with the resistive sections being provided adjacent the central aperture and between adjacent axial portions. In each of the above-described arrangements, the disk may be a semiconductor uniformly doped with impurities to develop a desired resistivity.

Still another particular arrangement in accordance with the invention may comprise a disk of a semiconductor material presenting a uniform conductivity, preferably without significant impurity content, with selected regions of the disk doped with impurities to establish resistive sections in these regions. Alternatively, an inverse arrangement may be provided with the body of the disk being resistive but with particular portions doped to establish conductive segments interspersed with resistive sections. In one specific embodiment, a substantially round semiconductor disk is selected of a material having a relatively high conductivity. A central opening, also round, is provided in the disk and four regions substantially equally spaced about the periphery of the central opening are selectively doped to establish the desired resistive sections.

In each embodiment of the invention, the disk as described is mounted within the ring structure to complete the strain gauge arrangement. In accordance with an aspect of the invention, the electrical leads may be cemented to the respective portions of the ring structure in order to protect the leads and the relatively fragile connections to the semiconductor disk. This results in the leads being brought out to points on the device from which less fragile electrical connections may be made to external circuitry. The external circuitry may include an energizing source and an indicator driven by an amplifier if desired, for providing the measurements signals provided by the transducer element.

It should be pointed out that for the configurations described above in accordance with the invention, the sensitivity of the transducer device may be varied as desired by controlling the thickness of the ring enclosing the semiconductor disk. Where extreme sensitivity is desired, as in the measurement of very light loads, a relatively thin ring may be employed to give the desired measurement of the developed strains. However, where the device is to be emploped for measuring relatively large loads, a thick ring may be used in conjunction with the semiconductor disk as described, thus adapting the range of measurement provided by devices of this configuration to the load limits which are anticipated. Accordingly, in the same measuring instrument, a number of different strain gauges may be connected depending upon the range of loads which is expected to be encountered.

In the fabrication of devices in accordance with the invention, particular methods may be employed to develop a device having the desired characteristics. In a preferred method in accordance with the invention, a blank of a semiconductor material is cut to the desired configuration comprising a roughly circular form and having four substantially similar segments equally spaced from each other. After cutting and shaping, the disk is etched to size, thus effectively preparing the surface for the attachment of the electrical leads. The disk is then masked so that only particular sections of the four segments of the disk are exposed, and these sections are plated, as by vacuum plating preferably with aluminum or gold, to prepare a surface to which the electrical leads may be attached. Following the plating step, the respective leads are welded to the four portions of the disk, preferably by a capacitive spot-welding arrangement, known in the art. Connections are then made to the four leads and the balance of the respective segments of the disk are tested, it being preferred that the resistance of the four segements without stress be substantially equal although a proportionality between the segments may be acceptable. Any deviations from the desired balance may be eliminated by selectively etching the segments of the disk until the resistances of the various segments are in balance. The disk is then put into the ring and sealed therein with an epoxy resin.

Where a metal ring is employed, it is preferred to prepare the ring by machining from a metal blank of a material having a particular temperature coefficient of expansion. Where the device is to be used as a strain gauge, the coefficient of expansion should be selected to match the coefficient of expansion of the component being tested. However, for other uses, a low coefficient of expansion is desired. Materials from which the ring may be machined include molybdenum, tungsten, and zirconium. After the disk is mounted within the ring with epoxy resin, the entire structure is heated to 200° F. and maintained at that temperature for eight hours to cure the epoxy resin without introducing stresses into the device or disturbing the crystal structure of the semiconductor disk. The leads which are welded to the disk are preferably brought out along the outside of the ring and cemented thereto with epoxy resin at the time the disk is mounted inside the ring. These leads may be carried to sleeve portions, mounted at selected points on the enclosing ring element but insulated therefrom. The leads may be soldered to the sleeve portions and connections may be made to these sleeve portions in a manner which provides a stable and rugged configuration for making the connections between the external circuitry leads and the leads which are welded to the disk.

A better understanding of the invention may be had from a consideration of the following detailed description, taken in conjunction with the accompanying drawing, in which.

Figure 1:
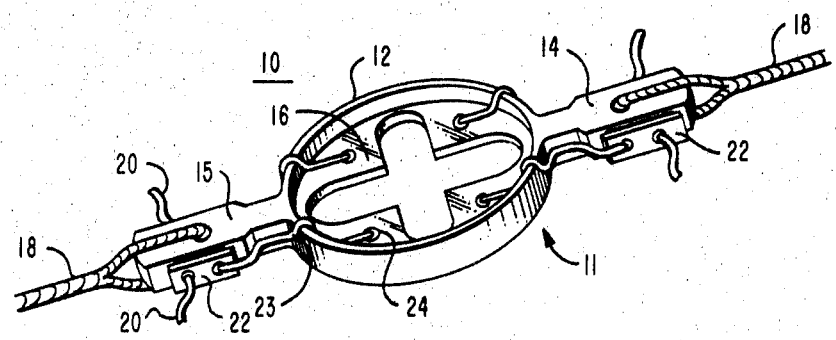
FIG. 1 is a perspective view of one particular arrangement in accordance with the invention.
Figure 2:
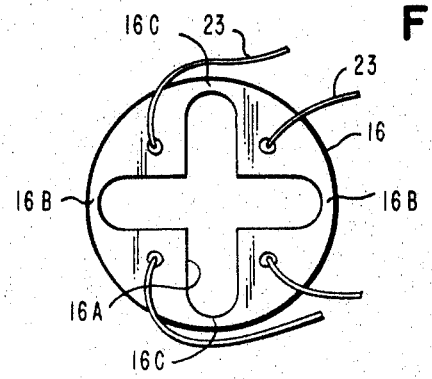
FIG. 2 is a plan view of a portion of the arrangement shown in FIG. 1.

FIG. 1 represents a perspective view of a particular force transducer in accordance with the invention including one particular arrangement of a semiconductor disk, as shown in FIG. 2, mounted therein. The transducer 10 of FIG. 1 includes a load distributing member 11 which is shown having a ring-shaped portion 12 in which a particularly shaped semiconductor disk 16 is encased. The disk 16, better shown in FIG. 2, has a circular periphery configured to match the inner surface of the opening of the ring portion 12 and has a cross-shaped opening which serves to divide the disk 16 into four similar symmetrically arranged portions, such as 16A. A lead 23 is individually affixed to each of the four portions of the disk 16, as by spot welding, at a point such as 24.

The load distributing member 11 of FIG. 1 has a pair of extensions 14 and 15 attached to the ring 12 at substantially diametrically opposite positions thereon. The extensions 14 and 15 are shaped to receive cables 18 for the application of tensile stress to the device. It will be understood that the particular configuration shown in FIG. 1 is intended for use as a transducer for the measurement of tensile loads.

Each of the extended portions 14 and 15 is shown bearing a strip such as 22 on each of two sides thereof. The strips 22 are of an electrically conducting material and are secured to the corresponding extension 14 or 15 by an insulating cement, as for example an epoxy resin. Preferably, epoxy resin is also used for sealing the disk 16 within the ring portion 12. The leads 23 from each of the four symmetrically shaped segments of the disk 16 are individually directed along surfaces of the extensions 14 or 15 and are brought out to corresponding strips 22, from which electrical leads 20 are attached for connection to external circuitry. This particular arrangement protects the relatively fragile leads 23 and their connections 24 to the semiconductor disk 12 from being subjected to the forces which may be applied from the external circuit connections. Moreover, by virtue of this arrangement, the external leads 20 which may become detached from the strips 22 can easily be reattached thereto, as by soldering for example, without having to go through the more delicate and precise spot welding step which is employed for attaching the leads 23 to the semiconductor disk 16.

Figure 3:
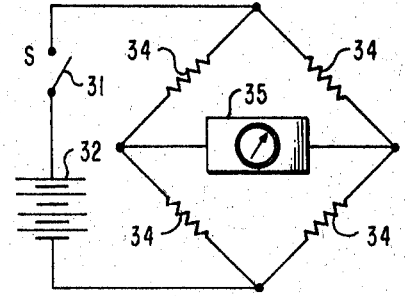
FIG. 3 is a schematic diagram of an electrical circuit in which arrangements in accordance with the invention may be utilized.

A transducer in accordance with the invention provides an electrical resistive bridge such as is shown in FIG. 3 having the four resistances 34. These resistances correspond to the connecting sections 16B and 16C between the individual segments 16A. The resistive bridge may be connected as indicated in the depicted circuit including a power source 32, and a switch 31, and an indicator device 35 which may include an amplifier and an output meter. As in conventional bridge operation, the indicator 35 may be adjusted to read zero or some reference reading when the bridge comprising the four resistance arms 34 is in balance (switch 31 closed). Thereafter, any unbalance of the resistance arms 34 develops a reading on the indicator 35 corresponding to the degree of unbalance of the bridge. The particular configuration of load indicator in accordance with the invention provides an electrical resistive bridge of improved sensitivity by virtue of the fact that resistive arms 34 in opposite arms of the bridge are affected inversely by the application of stress thereto. For example, where the transducer 10 of FIG. 1 is employed under tensile forces, diametrically opposite sections 16B are affected similarly, while the remaining opposite sections 16C are affected alike but oppositely to the effect on the sections 16B. Both changes contribute to the bridge unbalance and, as a result, only a slight force is required to produce a reading on the indicator 35. The ring configuration of the encasing structure 12 of the device 10 advantageously serves to distribute the applied loading forces evenly and symmetrically to the resistance sections 16B and 16C of the disk 16. The disk 16 may be fabricated from a semiconductor material, preferably silicon or any other material exhibiting the phenomenon of piezoresistivity.

Figure 4:
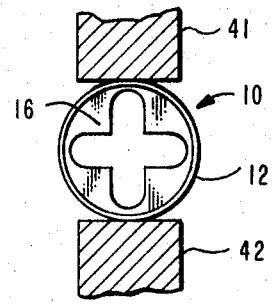
FIG. 4 is a representation of a second particular arrangement in accordance with the invention.

A similar configuration of the transducer 10 is shown in FIG. 4 as it may be employed for the measurement of compressive loading forces. In this arrangement, a disk 16 such as is shown in FIG. 2 is loaded within a ring 12 and placed between a pair of load-supporting columns 41, 42. The electrical connections, omitted for the sake of simplicity, may be brought out in a convenient fashion for connection to external circuitry such as that shown in FIG. 3. In this arrangement, compressive loading forces are distributed symmetrically by the ring configuration to the various sections 16B and 16C of the disk 16 and thus develop a change in the resistance of the resistive sections of the disk 16 which may be detected in the bridge circuit of FIG. 3.

Figure 6:
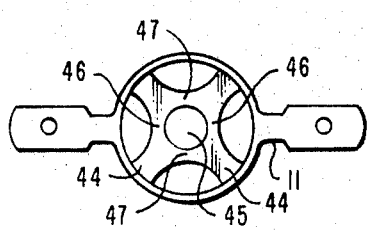
FIG. 6 is a plan view of one particular arrangement of the invention showing the orientation of the portion of FIG. 5 in the structure of FIG. 1.
Figure 5:
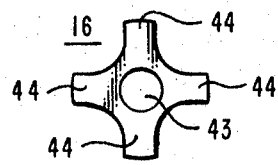
FIG. 5 is a view of a particular portion of arrangements of FIGS. 1 and 3 which may be employed as an alternative to the portion shown in FIG. 2.

An alternative configuration of the disk 16 which may be employed in the force measuring arrangements in accordance with the invention in place of the disk of FIG. 2 is shown in FIG. 5. In this arrangement, a disk is shaped with a central aperture 43 and four substantially equal and symmetrical radial segments 44 arranged along orthogonal diameters of the structure. The disk 16 of FIG. 5 may readily be fabricated from a circular disk by removing portions of the disk in four different quadrants. Electrical connections may be made to the radial segments 44 of the disk 16 of FIG. 5 in the manner described in connection which the arrangement of FIG. 1, and the disk configuration of FIG. 5 may be employed in the structures of FIGS. 1 and 4 in place of the FIG. 2 configuration shown therein. FIG. 6 shows the orientation of the disk 16 of FIG. 5 in a load distributing member 1 of the type shown in FIG. 1. The resistive sections 46 and 47 which comprises the resistances 34 of the bridge circuit of FIG. 3 are provided by the portions of the disk 16 between the central aperture and the four quadrants removed during fabrication. Other arrangements of piezoresistive structures may be provided for use in the ring-shaped transducer 10 for developing the desired electrical resistive bridge configuration in accordance with the invention.

Figure 7:
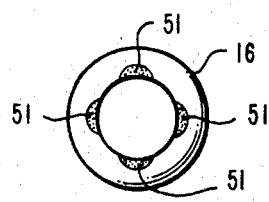
FIG. 7 represents another alternative arrangement of a portion of the invention similar to the portions of FIGS. 2 and 5.

FIG. 7 represents another disk arrangement in accordance with the invention for use in the ring structure 12 as a force transducer 10. This disk 16 may comprise a substantially circular semiconductor element presenting a uniform conductivity of a first value and having a substantially circular central opening. In selected regions substantially equally spaced about the opening the semiconductor is doped to establish a particular impurity level providing a conductivity of a second value different from the conductivity of the remainder of the disk. Suitable connections in the manner described hereinabove may connect the device in the bridge circuit where the disk, mounted within the associated ring structure, may be used as a load transducer.

Fabrication of the devices in accordance with the invention may be advantageously effected in accordance with the following method. A wafer or disk of a material such as a semiconductor exhibiting a piezoresistive effect may be prepared in the desired configuration by shaping, as by supersonic drilling or electron or laser beam bombardment, or by selective etching or erosion, after which a final etching step is performed to prepare the surface of the disk. Selective doping of the semiconductor disk may be used to provide the element of FIG. 7. It is essential that the periphery of the disk match the inner surface of the ring-shaped load distributing member in which the disk is to be mounted, but it will be understood that the inner surface of the ring is in a substantially circular configuration. After the surface of the disk is prepared by the final etching step, the disk is masked so as to cover up the exposed surfaces thereof except for the portions at which the electrical leads are to be attached. The masked disk is then placed in a container for vacuum plating and a suitable metal film, such as aluminum or gold, is vacuum plated on the portions which are not covered by the mask. Thereafter, electrical leads are attached to the vacuum plated films, preferably by spot welding. A capacitive welding technique, well known in the art, may be employed. Following the welding step, it is advisable to test the balance of the four resistive sections of the disk by measuring the relative resistance of the individual portions. Should any deviation from the desired balance of the four resistances be detected, the balance may be adjusted by selectively etching or doping one or more of the four individual resistive sections of the disk until the respective resistances are properly matched.

The ring is prepared by machining to the desired shape from a single blank of a metal having a low coefficient of expansion, or one which is matched to the coefficient of expansion of an associated test component. Examples of metals which may be used for the fabrication of the ring are molybdenum, tungsten, and zirconium. Preferably, following the machining of the metal ring member, the ring may be annealed to eliminate unwanted locked-in stresses.

After the ring and the disk are separately fabricated, the disk is placed inside the ring, properly aligned therein, and sealed with epoxy resin. It is desired to bring the leads which have been welded to the disk out along the surfaces of the ring member and attach them to mounting strips positioned along the ring member as described above. Epoxy resin may be used for affixing the leads in position along the ring and for providing the desired electrical isolation between the leads and the ring. Thereafter, the entire structure is heated to 200° F. and maintained at that temperature for eight hours to cure the epoxy resin. If a structure of the type shown in FIG. 1 is prepared, the cables 18 may be attached by threading through the extended portions 14, 15 and securing thereon. The device is thereafter ready for use as a transducer by connecting in an electrical circuit such as that shown in FIG. 3.

Transducers in accordance with the invention advantageously provide a sensitivity in a compact structure which has hitherto been unavailable. The sensitivity of the device may be controlled by varying the thickness of the ring during fabrication. A typical structure may provide a ring having a thickness between inner and outer surfaces of .015 inch with an outer diameter of .125 inch and an inner diameter of .095 inch. In one measurement circuit, with a 10-volt input the device presents a full scale indication for four pounds' load with a sensitivity of 400 millivolts per pound. However, if the device is intended for use in the measurement of greater loads, essentially the same disk can be employed with a ring having a greater thickness and greater outside daimeter. Such a device functions mechanically in the same fashion and may be used in the same manner.

Although there have been described above specific fabrication methods and arrangements of force transducer structures in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A force transducer device for measuring force comprising a load distributing member configured to provide an aperture and having the force applied at the outer periphery thereof, a piezoresistive element having a central aperture and configured to provide four distinct segments interspersed with four distinct resistive sections substantially symmetrically located about the central aperture of the element, means for mounting said element within the aperture of the load distributing member, and means for connecting said distinct segments in an electrical circuit.

2. A force transducer device in accordance with claim 1 wherein said element comprises a disk having a central cross-shaped aperture with the resistive sections being provided by the reduced portions of the disk at the ends of the arms of the cross-shaped aperture.

3. A force transducer device in accordance with claim 2 wherein said piezoresistive element comprises a semiconductor disk having a substantially circular periphery and further including means for insulating said disk from said load distributing member.

4. A force transducer in accordance with claim 1 wherein said element comprises a disk, said central aperture is having a central substantially circular aperture and said distinct resistive sections comprise regions of reduced cross section substantially equally spaced about said central aperture.

5. A force transducer in accordance with claim 4 wherein said piezoresistive element comprises a semiconductor disk having a periphery shaped to fit within the aperture of the load distributing member and further including means for insulating said disk from said member.

6. A force transducer in accordance with claim 1 wherein said element comprises a disk of a semiconductor material with variations in the impurity doping thereof selectively introduced at substantially equally spaced intervals about the disk to provide the four resistive sections.

7. A force transducer in accordance with claim 6 wherein said disk comprises a semiconductor toroid selectively doped with impurities to provide said resistive sections about the inner opening of the toroid.

8. A force transducer device in accordance with claim 1 wherein said load distributing member comprises a metal ring of a material having a coefficient of expansion substantially equal to the coefficient of expansion of a component of which strain is to be measured.

9. A force transducer device in accordance with claim 1 wherein said load distributing member comprises a ring-shaped portion having a pair of extensions attached thereto at substantially diametrically opposite points of the ring-shaped portion, said ring-shaped portion and said extensions being machined from a single metal blank.

10. A force transducer in accordance with claim 1 wherein said load distributing member comprises a metal ring having a difference between inside diameter and outside diameter selected to provide a sensitivity corresponding to a particular range of forces to be measured.

11. A force transducer device in accordance with claim 1 wherein said connecting means comprises four separate leads individually and respectively connected to the four distinct segments of the element, means attaching said leads along selected surfaces of the load distributing member but insulated therefrom, a plurality of electrically conducting strips attached to the load distributing member but insulated therefrom, a plurality of circuit leads, and means connecting one of said circuit leads and one of said leads extending along the surfaces of the load distributing member to each of the conducting strips.

12. A force transducer arrangement comprising a load distributing member configured to provide a central aperture and having force to be measured applied thereto, a piezoresistive element having a central aperture and configured to provide four distinct segments interspersed with four electrically resistive sections substantially symmetrically located about the central aperture of the element, the element comprising a wheatstone configuration of a resistive bridge with the four resistive sections providing the four sides of the bridge, means affixing the element in an aligned orientation within the aperture of the load distributing member, and means connected to said four distinct segments of the piezoresistive element to energize said bridge and to provide an indication of a variation in the resistive balance of the bridge.

13. A force transducer arrangement for measuring force comprising a first member having a ring-shaped portion, the forces being applied at the outer surface of the ring-shaped portion of the first member, a pair of extensions attached to said ring-shaped portion at diametrically opposite points, a piezoresistive element configured to provide at least four distinct resistive sections, said element having a peripheral configuration matching the inner surface of the ring-shaped portion of the first member and being mounted thereon, means for connecting the four distinct resistive sections of the piezoresistive element in an electrical bridge circuit, and indicating means coupled to the bridge circuit to provide an indication in response to signals from the piezoresistive element.

14. A force transducer arrangement comprising a load distributing member having a ring-shaped portion, a piezoresistive element configured to provide at least four distinct resistive sections, said element having a peripheral configuration matching the inner surface of the ring-shaped portion of the load distributing member and being mounted thereon, means for applying forces at the outer surface of the ring-shaped portion of the load distribution member, means for connecting the distinct resistive sections of the piezoresistive element in an electrical bridge circuit, and indicating means coupled to the bridge circuit to provide an indication in accordance with the condition of the piezoresistive element.

References Cited

UNITED STATES PATENTS

| | | | |
|---|---|---|---|
| 2,640,353 | 6/1953 | Hefner | 73—141 |
| 2,963,911 | 12/1960 | Courtney-Pratt et al. | 73—88 |
| 3,084,300 | 4/1963 | Sanchez | 73—88 |
| 3,251,222 | 5/1966 | Fenner | 73—88 |

RICHARD C. QUEISSER, *Primary Examiner.*

C. I. McCLELLAND, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,438,249                         April 15, 1969

Akio Fukunaga

It is certified that error appears in the above identified patent and that said Letters Patent are hereby corrected as shown below:

Column 2, line 16, "sensitvity" should read -- sensitivit --; line 41, "unbalanecs" should read -- unbalances --. Colum 6, line 10, "which" should read -- with --; line 14, "1" shoul read -- 11 --; line 16, "comprises" should read -- comprise -- Column 7, line 33, "daimeter" should read -- diameter --; line 70, cancel "having a central"; same line 70, cancel "aperture"

Signed and sealed this 14th day of April 1970.

(SEAL)
Attest:

Edward M. Fletcher, Jr.                   WILLIAM E. SCHUYLER, JR
Attesting Officer                        Commissioner of Patents